(12) United States Patent
Nagai

(10) Patent No.: US 6,490,687 B1
(45) Date of Patent: Dec. 3, 2002

(54) LOGIN PERMISSION WITH IMPROVED SECURITY

(75) Inventor: Hiroto Nagai, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/266,777

(22) Filed: Mar. 12, 1999

(30) Foreign Application Priority Data

Mar. 13, 1998 (JP) .............................................. 10-063100

(51) Int. Cl.$^7$ .............................. H04B 7/26; H04M 1/66
(52) U.S. Cl. ........................ 713/202; 713/200; 713/201; 380/255; 380/29
(58) Field of Search ................................. 713/200, 201, 713/202, 150, 153, 161, 162, 170, 168, 182, 184; 380/23, 25, 29, 49, 255, 271, 283; 340/825.44; 709/217

(56) References Cited

U.S. PATENT DOCUMENTS

| | | | | |
|---|---|---|---|---|
| 5,387,904 A | * | 2/1995 | Takada | 356/3.09 |
| 5,592,553 A | * | 1/1997 | Guski et al. | 380/29 |
| 6,084,969 A | * | 7/2000 | Wright et al. | 380/255 |
| 6,108,790 A | * | 8/2000 | Moriya et al. | 709/217 |
| 6,237,093 B1 | * | 5/2001 | Vatanen | 380/255 |

FOREIGN PATENT DOCUMENTS

| | | |
|---|---|---|
| EP | 0 033 833 | 8/1981 |
| EP | 0 817 518 | 1/1998 |
| GB | 2 019 606 | 10/1979 |
| GB | 2 168 831 | 6/1986 |
| GB | 2 300 288 | 10/1996 |
| JP | A 5-235932 | 9/1993 |
| JP | 5-235932 | 9/1993 |
| JP | 5-327693 | 10/1993 |
| JP | 9-93367 | 4/1997 |
| JP | 10-145354 | 5/1998 |
| JP | A 10-145354 | 5/1998 |
| JP | 10-215488 | 8/1998 |
| JP | A 10-215488 | 8/1998 |
| WO | WO 96/13920 | 5/1996 |

OTHER PUBLICATIONS

"Nikkei Communication", pp. 105–109, Nikkei BP Co., Apr. 21, 1995, No. 244.

Nikkei Open System, Nikkei BP Co., Ltd., Dec. 15, 1997, No. 57, pp. 246–253.

Net PC, ASKII Co. Ltd., Dec. 1, 1997, vol. 2, No. 12, pp. 66–72.

PC Work!, Mainich Communications Co., Ltd., Jun. 18, 1997, vol. 4, No. 6, pp. 192–195.

* cited by examiner

*Primary Examiner*—Ly V. Hua
(74) *Attorney, Agent, or Firm*—Young & Thompson

(57) ABSTRACT

A login permission method improving network security and efficiently performing a login process is disclosed. In a host-based network, information required for outside login is previously registered with the host-based network. When an outside login request is received from a terminal through the communications line, it is determined whether user's login information is validated based on the registered information required for outside login. Only when the user's login information is validated, the terminal is permitted to log in to the host-based network from outside.

8 Claims, 7 Drawing Sheets

LOGIN PERMISSION WITH IMPROVED SECURITY

BACKGROUND OF THE INVENTION

1. Field of the Invention

The present invention generally relates to a communications system permitting authorized users to log in to a host computer or server and, in particular, to a login permission method and system from outside to the host computer with improved security.

2. Description of the Related Art

In a premises network system to which a user can access from outside through a communications line, network security is one of the most important issues. A major focus of network security on computer systems like this is the prevention of system use by unauthorized persons. To protect the system from unauthorized use, the system requires a user to enter a password to verify that the user is authorized to access the network.

According to a conventional security method, a user name and a user's authentication information are registered on the host computer in advance. When a user's mobile terminal has accessed to the host computer through a communications line, the user name is sent to the host computer and, if it matches the registered user name, then the user's authentication information is also sent to the host computer. In this way, only when both the user name and the user's authentication information match the registered ones, a one-time password is sent from the host computer to the mobile terminal. The mobile terminal is allowed to log in to the host computer using the one-time password.

When an unauthorized person has known the user name and the authentication information of the authorized user, however, the unauthorized person can get the one-time password easily, resulting in comprised security of the network. Further, the conventional technique fails to provide sufficiently rapid connection establishment because the one-time password transmission is performed between the host computer and the mobile terminal during the login process.

An authentication method using secret-key encryption has been proposed in Japanese Patent Unexamined Publication No. 5-327693. A base station transmits random data to a mobile terminal. At the mobile terminal, first and second encrypted authentication signals are produced based on the received random data, a first secret key of the mobile terminal, and a second secret key input by the subscriber, respectively. The encrypted authentication response data is transmitted to the base station.

At the base station, the same encryption process is performed to produce encrypted check data and matches it with the encrypted authentication response data received from the mobile terminal. If the produced encrypted data matches the received one, the authentication check is affirmative.

In a combination of the conventional one-time password security method and the conventional authentication method using secret-key encryption, pluralities of data exchanges are needed for login between a mobile terminal and a host computer. Therefore, it is very difficult to shorten the time required for login completion.

SUMMARY OF THE INVENTION

An object of the present invention is to provide a login permission method and system which can improve network security and efficiently perform a login process at a short time.

According to the present invention, in a host-based network, information required for outside login is previously registered with the host-based network. When an outside login request is received from a terminal through the communications line, it is determined whether user's login information received is validated based on the registered information required for outside login. Only when the user's login information is validated, the terminal is permitted to log in to the host-based network from outside.

The user's login information is preferably a user name and a user's authentication information, wherein the user's authentication information is encrypted at the terminal and is decrypted at the host-based network according to a predetermined encryption scheme based on the registered information required for outside login. Further preferably, the registered information required for outside login include a unique information uniquely assigned to the terminal, such as an identification number assigned to a selective call receiver or a pager which can be detachably connected to the terminal.

Preferably, the registered information required for outside login further include a one-time password that is temporarily assigned to the terminal by the host-based network when the information required for outside login is registered with the host-based network.

DETAILED DESCRIPTION OF THE PREFERRED EMBODIMENTS

Figure 1:
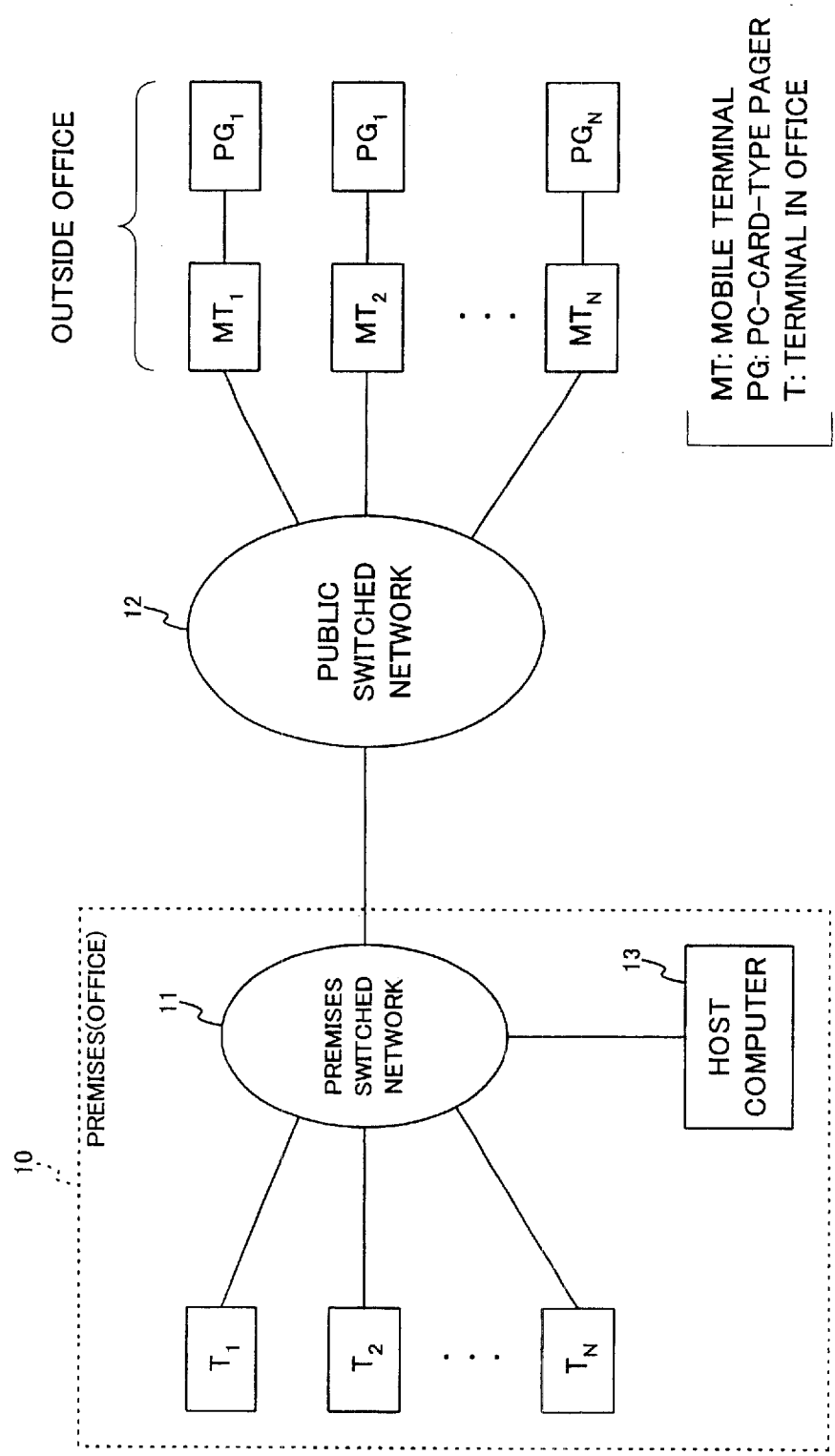
FIG. 1 is a schematic block diagram showing the configuration of a network system including a login system according to the present invention.

As shown in FIG. 1, assuming that a network is provided in an office building 10 to provide services to authorized users. The network is composed of a premises switched network 11 which can be connected to a public switched network 12 outside the office, such as the public switched telephone network. Hereinafter, a combination of the premises switched network 11 and the public switched network 12 is called a stationary switched network. The premises switched network 11 is connected to a host computer 13 which can provide services to a plurality to user terminals $T_1$–$T_N$ installed within the office building 10. For example, an authorized user can log in to the host computer 13 through any user terminal by entering the correct password assigned to the user.

Further, the respective authorized users have PC-card pager $PG_1$–$PG_N$ and mobile or portable terminals $MT_1$-$MT_N$ such as notebook computers. A PC-card pager is a PC card having a selective call receiver, or a pager, therein. As described in detail later, a user's PC-card pager stores necessary information including the pager identification number and the encryption table. The PC-card pager is inserted into the PC card slot (PCMCIA slot) of a mobile terminal and thereby the authorized user can log in to the host computer 13 from outside through the public switched network 12. In other words, by connecting the PC-card pager of the authorized user to the mobile terminal, the user can also log in to the host computer 13 outside the office building 10.

A desktop computer with the communication function and the PC card slot can be also used instead of a mobile terminal MT. That is, the user inserts his/her PC-card pager into the PC card slot of the desktop computer located outside the office and starts the outside login operation as will be described later. Hereinafter, the descriptions with be made in the case of a mobile terminal as an example.

HOST AND PC-CARD PAGER

Figure 2:
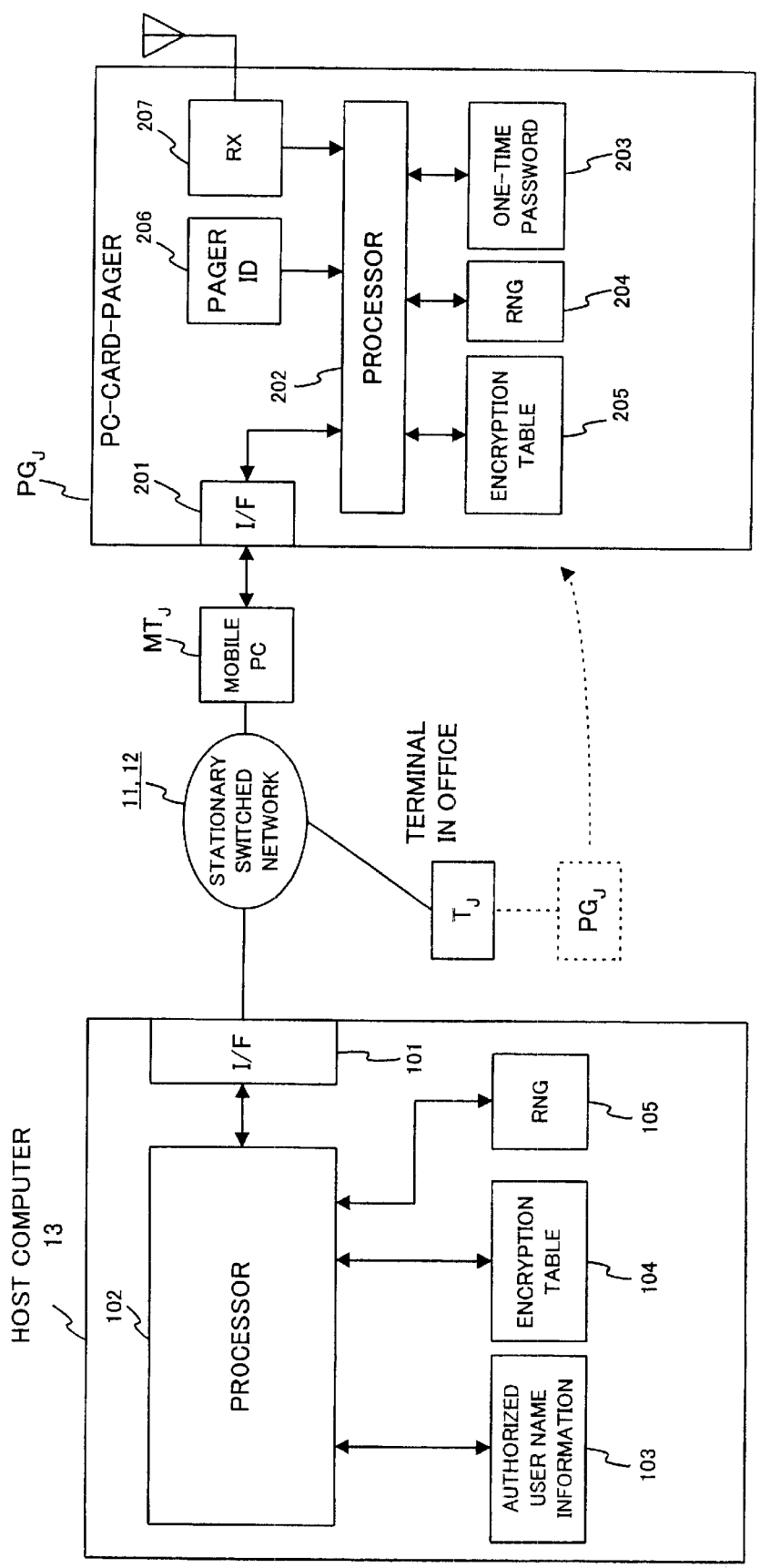
FIG. 2 is a block diagram showing the detailed internal circuits of a host computer and a PC-card pager in an embodiment of a login system according to the present invention.

Referring to FIG. 2, the host computer 13 is connected to the stationary switched network (11, 12) through an interface 101 which may be a modem or a set of digital service unit (DSU) and a terminal adapter (TA). The host computer 13 performs necessary controls including the login control according to the present invention by running control programs on a processor 102.

The host computer 1 further includes a memory 103 for storing authorized user name information, an encryption table 104, and a random number generated (RNG) 105. The authorized user name information includes the user name, the one-time password temporarily assigned to the user, and the page ID assigned to the PC-card pager $PG_J$ to be used by the authorized user. The authorized user name information is registered onto the memory 103 when receiving an outside login permission request from a user terminal $T_J$ (J=1, 2, –, N) in the office 10. The memory 103, the encryption table 104, and the random number generator 105 are used to decrypt the encrypted authentication information received from the mobile terminal through the stationary switched network. As described later, only users who has been registered in the memory 103 and has sent the correct authentication information encrypted in a predetermined encryption scheme are permitted to log in to the host computer 13.

A PC-card pager $PG_1$ is a PCMCIA card having encryption function and pager function. The PC-card pager $PC_J$ has an interface 201 which is designed to be connected to the PC card slot of a mobile terminal $MT_J$ (here, notebook computer). The PC-card pager $PG_J$ performs the encryption function and the pager function, which may be implemented by programs running on a processor 202.

The PC-card pager $PG_J$ further includes a password memory 203 for storing one-time password, a random number generator (RNG) 204, an encryption cable 205, and a pager ID memory 206 storing the pager ID assigned to the PC-card pager $PG_J$.

The one-time password, as will be described later, is transferred from the host computer 13 to the PC-card pager $PG_J$ and then stored onto the password memory 203 when the PC-card pager $PG_J$ is connected to the user terminal $T_J$ in the office 10 and the user makes the outside login permission request.

The encryption table 205, the random number generator 204, and the pager ID memory 206 are used to encrypt the authentication information of the user. To successfully perform encryption of the PC-card pager $PG_J$ and decryption at the host computer 13, the encryption table 205 and the random number generator 204 of the PC-card pager $PG_J$ are the same as the encryption table 104 and the random number generator 105 of the host computer 13, respectively.

The PC-card pager $PG_J$ further includes a radio receiver 207 which is used to receive a paging or selective calling signal from a radio base station (not shown). As will be described later, the pager function may be used to receive the one-time password from the host computer 13 through a paging system.

The user terminals $T_1$–$T_N$ each have a PCMCIA slot into which the PC-card pager $PG_J$ is inserted for data communication. More specifically, the pager ID is sent from the PC-card pager $PG_J$ to the host computer 13 and the one-time password is sent from the host computer 13 to the PC-card pager $PG_J$.

The mobile terminals $MT_1$-$MT_N$ each have the PCMCIA slot for the PC-card pager and a data communication means for communicating with the host computer 13 through the stationary switched network (11, 12). The data communication means may be a modem or a set of digital service unit (DSU) and a terminal adapter (TA). Alternatively, the data communication means may be a wireless communication means. Further, the mobile terminals $MT_1$-$MT_N$ each have a central processing unit (CPU) on which a control program for a PC-card pager may run.

As described before, the present invention is not limited to mobile terminals $MT_1$-$MT_N$. A desktop computer with the communication function and the PC card slot can be also used instead of a mobile terminal MT.

LOGIN SEQUENCE

Next, the login procedure will be described in the case where a user having a mobile terminal $MT_J$ and a PC-card pager $PG_J$ therewith logs in to the host computer 13 through the stationary switched network.

When the user intends to log in to the host computer 13 outside the office 10, the user inserts the PC-card pager $PG_J$ of the user's own into the PC card slot of the in-use terminal $T_J$ and then makes the outside login permission request to the host computer 13 through the in-user terminal $T_J$. When receiving the outside login permission request from the terminal $T_J$, the host computer 13 reads the pager ID from the PC-card pager $PG_J$ and stores the pager ID and the user name as authorized user name information onto the memory 103. Alternatively, the pager ID may be entered by the user through the keyboard of the terminal $T_J$.

Next, the host computer 13 informs the user of the one-time password which should be used in the case of outside login through the mobile terminal $MT_J$. The one-time password may be displayed on screen of the terminal $T_J$. Here, assuming that the one-time password is transferred from the host computer 13 to the password memory 203 of the PC-card pager $PG_J$.

Thereafter, the user logs out and goes out with the mobile terminal $MT_J$ and the PC-card pager $PG_J$.

Figure 3:
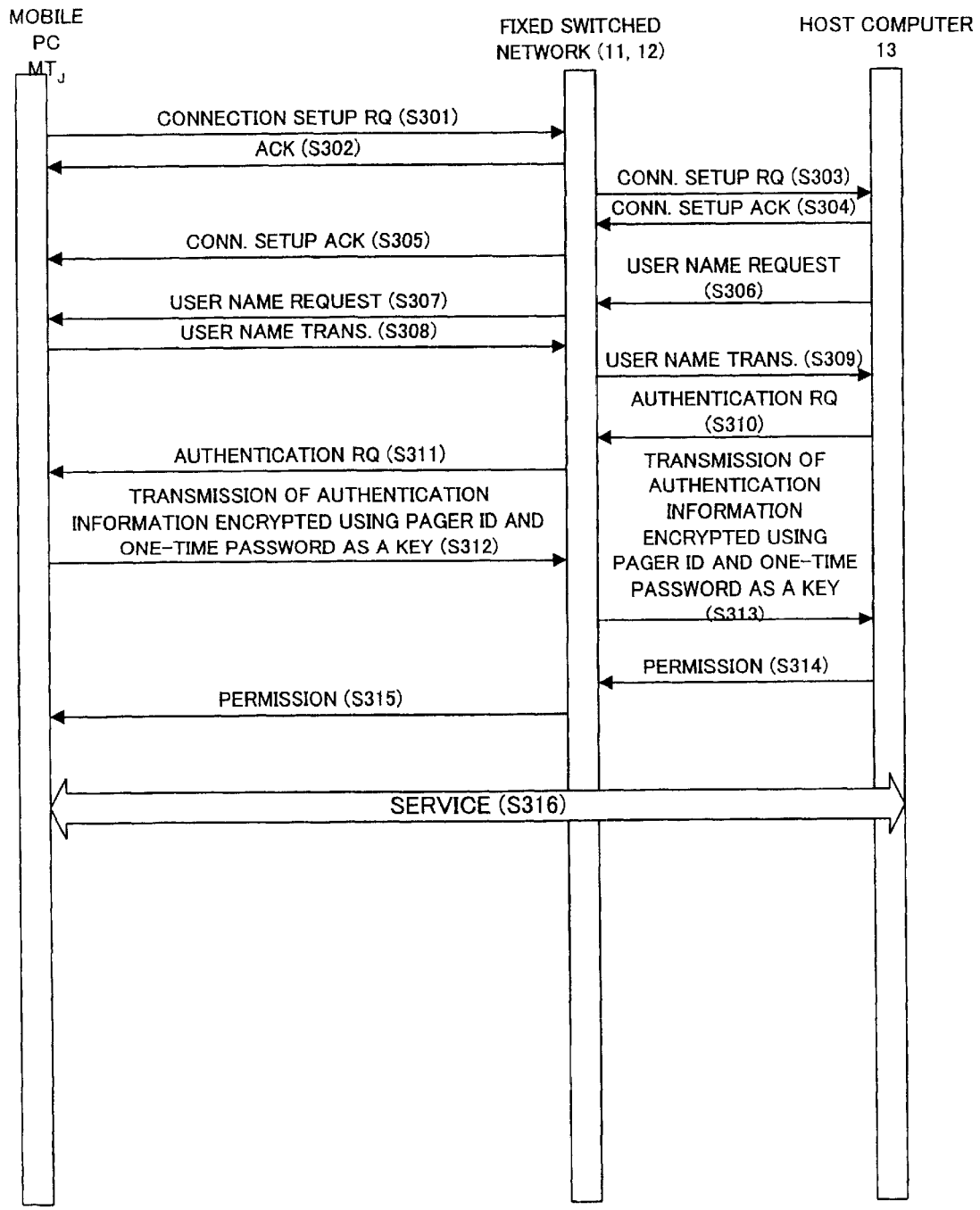
FIG. 3 is a diagram showing a sequence of a successful login process in an embodiment of a login method according to the present invention.

Referring to FIG. 3, in the case where the user needs services provided by the host computer 13 from outside, the user inserts the PC-card pager $PG_J$ into the PC card slot of the mobile terminal $MT_J$ and than the mobile terminal $MT_J$ is started making a connection setup request to the stationary switched network (step S301).

If it is possible to establish the requested connection, the stationary switched network sends an acknowledgement (ACK) back to the mobile terminal $MT_J$ and thereby the connection from the mobile terminal $MT_J$ to the stationary switched network is established (step S302). Subsequently, the stationary switched network sends a connection setup request to the host computer 13 (step S303) and, when receiving the connection setup acknowledgement from the host computer 13 (step S304), the connection between the stationary switched network and the host computer 13. Thereafter, the stationary switched network sends a connection setup acknowledgement back to the mobile terminal $MT_J$ and thereby the connection between the mobile terminal $MT_J$ and the host computer 13 is established (step S305).

When the connection has been established, the host computer 13 sends a user name request for the user name information of the user to the stationary switched network (step S306). When receiving the user name request, the stationary switched network sends the user name request to the mobile terminal $MT_J$ (step S307).

When receiving the user name request from the host computer 13 through the stationary switched network, the user is prompted to enter a user name through the keypad of the mobile terminal $MT_J$. The user name may be stored in a memory and be read out from the memory in response to the user name request. The user name is sent to the stationary switched network (step S308) and further to the host computer 13 (step S309).

When receiving the user name, the processor 102 of the host computer 13 searches the memory 103 for the received user name. If found, the processor 102 determines that the user name has been registered as an outside login user name and then sends an authentication request to the stationary switched network (step S310) and further to the mobile terminal $MT_J$ (step S311). If not found, the processor 102 determines that the user name has never been registered as an outside login user name and stops the login process to reject the login request.

When receiving the authentication request from the host computer 13, the user is prompted to enter the authentication information through the keypad of the mobile terminal $MT_J$. The authentication information may be stored in a memory and be read out from the memory in response to the received authentication request. When the authentication information has been entered, it is transferred to the PC-card pager $PG_J$. The processor 202 of the PC-card pager $PG_J$ encrypts the authentication information using the pager ID, the one-time password, the encryption table 205, and the random number generator 204. The details of the encryption will be described later.

The encrypted authentication information is sent back to the mobile terminal $MT_J$ and is then transmitted to the stationary switched network (step S312) and further to the host computer 13 (step S313).

At the host computer 13, the encrypted authentication information received from the mobile terminal $MT_J$ is decrypted using the encryption table 104, the random number generator 105 and the authorized user name information in the way similar to the encryption steps performed in the PC-card pager $PG_J$.

Then, the processor 102 compares the decrypted authentication information with the registered authentication information stored in the memory 103. If the decrypted authentication information matches the registered one, the host computer 13 sends a login permission message to the stationary switched network (step S314) and further to the mobile terminal $MT_J$ (step S315). In this manner, the user can obtain desired services from the host computer 13 (step S316). Contrarily, If the decrypted authentication information does not match the registered one, the login is rejected.

ENCRYPTION

Figure 4:
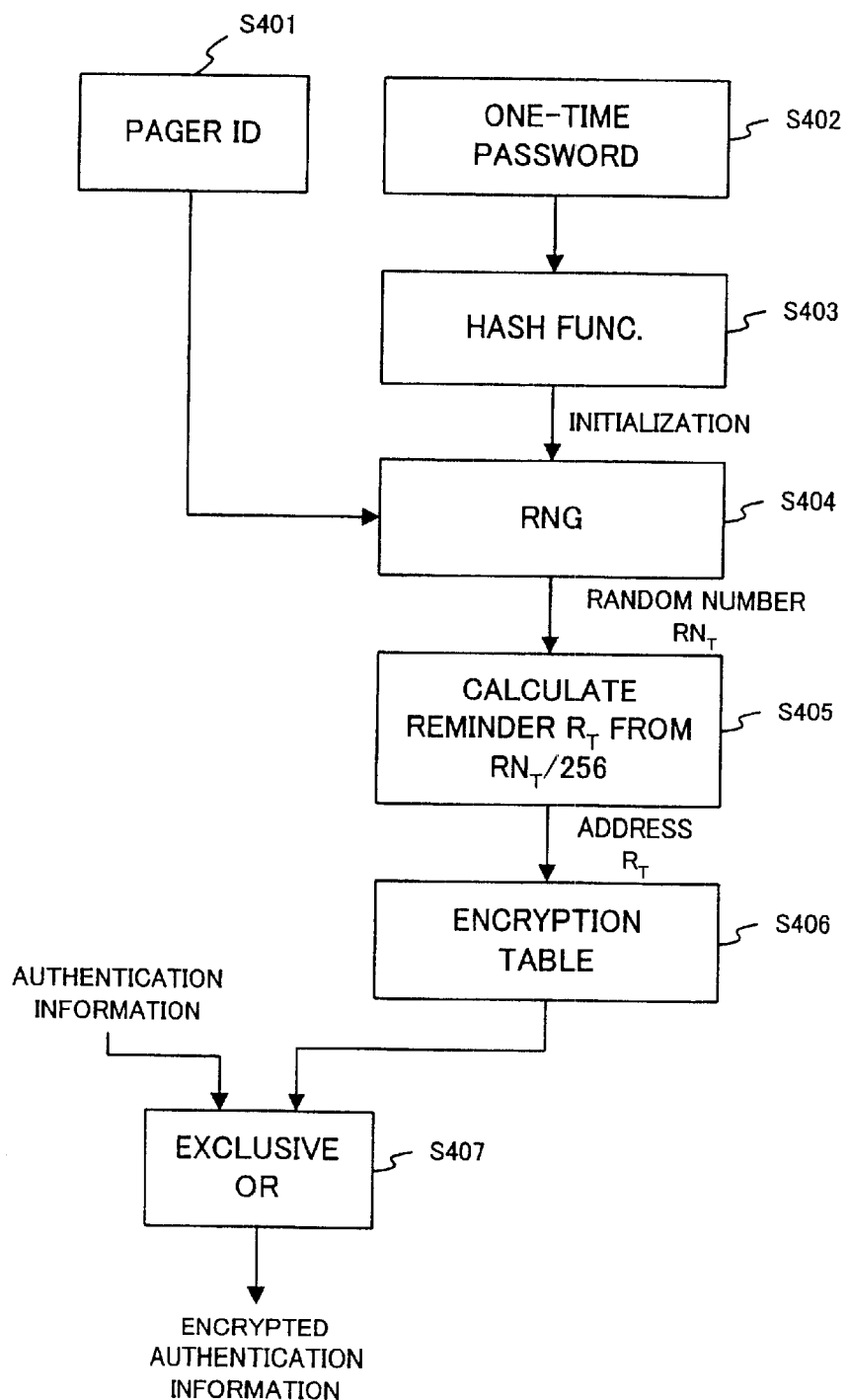
FIG. 4 is a diagram showing an operation of encryption process in the embodiment of the login method.

Referring to FIG. 4, the encryption of the authentication information is performed at the PC-card pager. When the user enters the authentication information, the processor 202 of the PC-card pager $PG_J$ reads the pager ID from the pager ID memory 206 (step S401) and the one-time password from the password memory 203 (step S402). Then, the processor 202 calculates a Hash value H from the one-time password using the Hash function (step S403).

The processor 202 initializes the random number generator 204 according to the Hash value H and then obtains a random number $RN_T$ from the random number generator 104 according to the pager ID (step S404). Further, the processor 202 converts the random number $RN_T$ to a number $R_T$ ranging from 0 to 255 by dividing the random number $RN_T$ by 256 to obtain the reminder $R_T$ thereof (step S405).

Subsequently, the processor 202 reads encryption value from the location of the encryption table 205 which is addressed with the reminder $R_T$ (step S406). Finally, the processor 202 exclusive-ORs the encryption value read from the encryption table 205 and the authentication information entered by the user to produce encrypted authentication information (step S407). The encrypted authentication information is transmitted to the host computer 13.

When receiving the encrypted authentication information, the decryption steps are performed in the similar way. More specifically, the processor 102 of the host computer 13 reads the pager ID and the one-time password of the authorized user name from the memory 103. Then, the processor 102 calculates a Hash value H from the one-time password using the Hash function and initializes the random number generator 105 according to the Hash value H and then obtains a random number $RN_T$ from the random number generator 105 according to the pager ID. Further, the processor 102 converts the random number $RN_T$ to a number $R_T$ ranging from 0 to 255 by dividing the random number $RN_T$ by 256 to obtain the reminder $R_T$ thereof.

Subsequently, the processor 102 reads encryption value from the location of the encryption table 104 which is addressed with the reminder $R_T$. Finally, the processor 102 exclusive-ORs the encryption value read from the encryption table 104 and the encrypted authentication information received from the mobile terminal to reproduce the original authentication information. The decrypted authentication information is matched with the registered one.

LOGIN REJECTION AND PERMISSION

Figure 5:
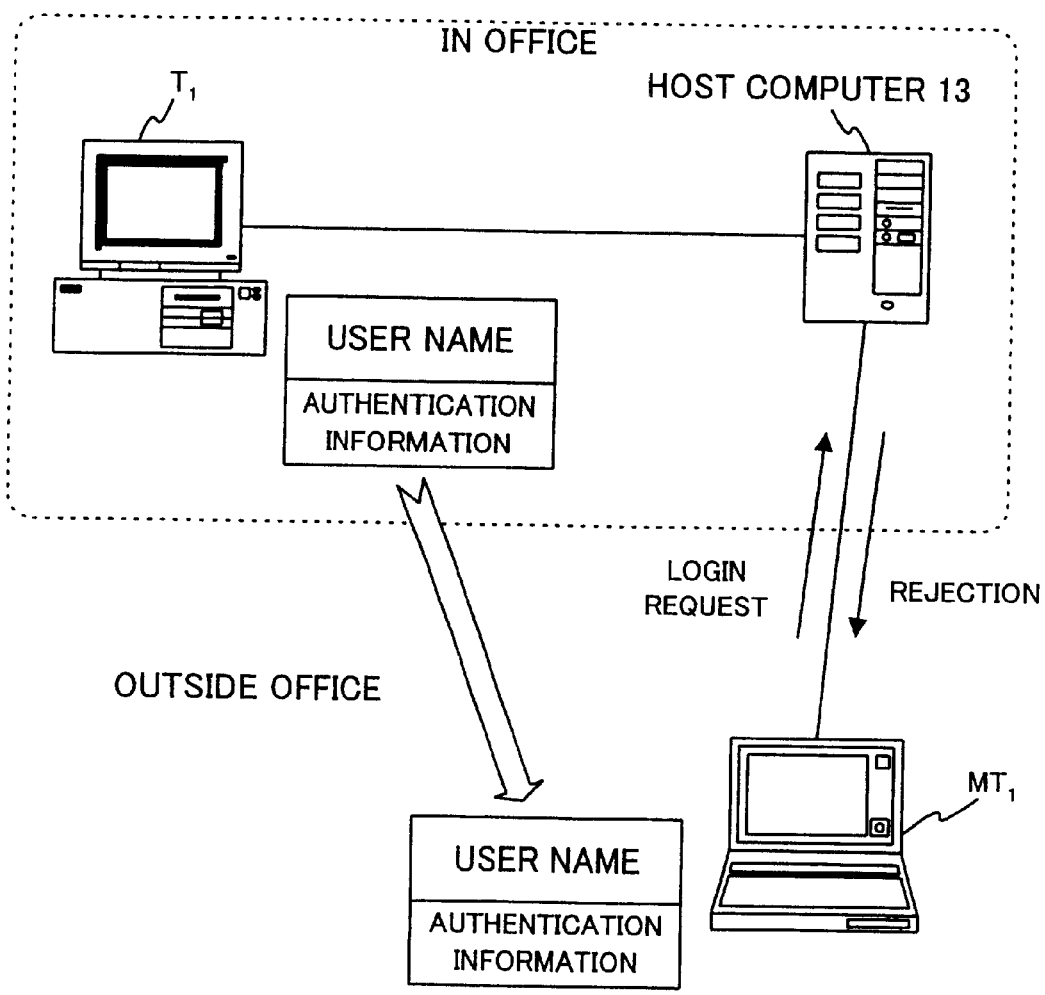
FIG. 5 is a schematic diagram showing an operation of the embodiment of the login method when a mobile terminal fails to log in to the host computer.
Figure 6:
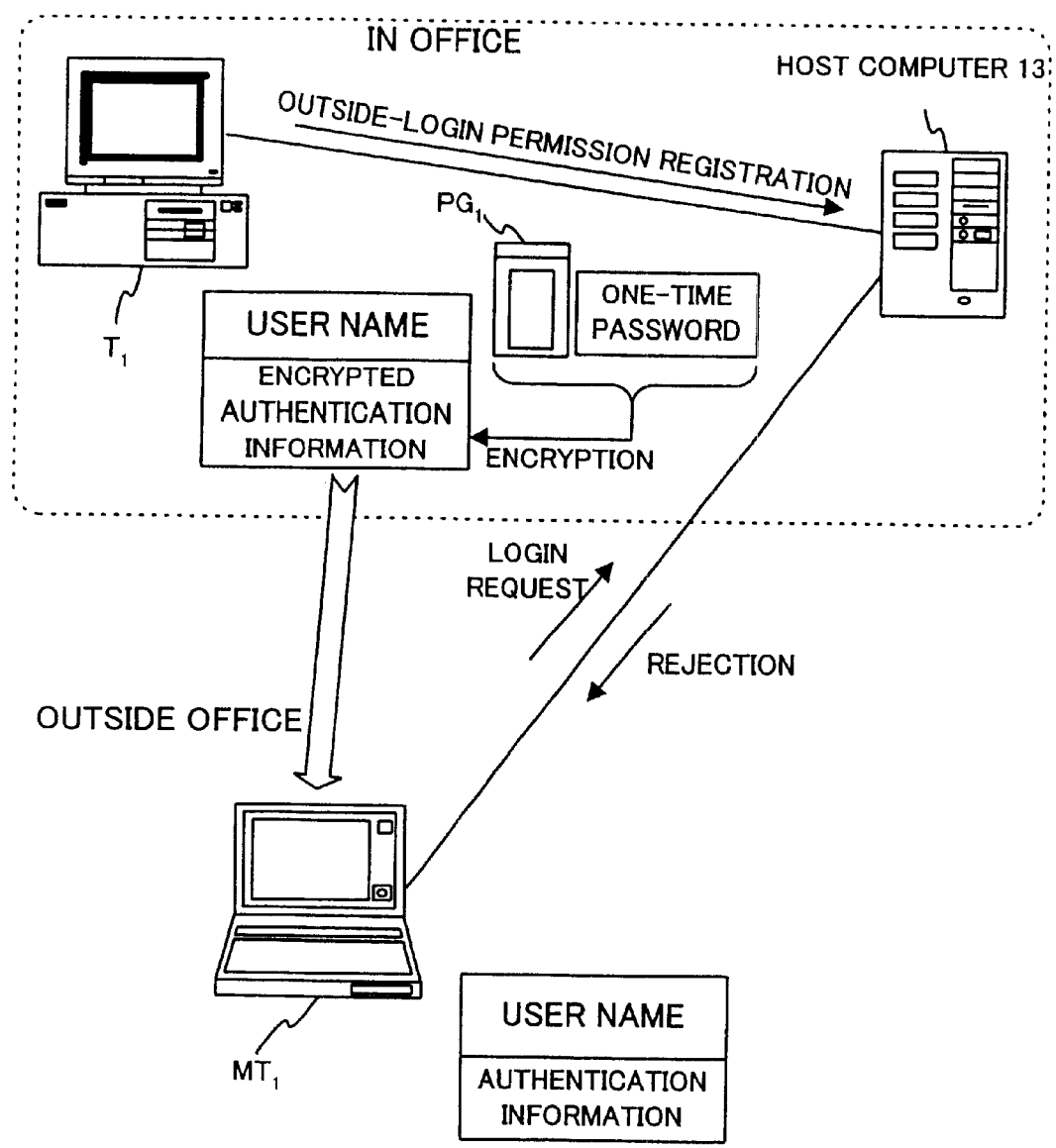
FIG. 6 is a schematic diagram showing another operation of the embodiment of the login method when a mobile terminal fails to log in to the host computer.

FIGS. 5 and 6 shows login rejection cases. In the case shown in FIG. 5, the user is not authorized to log in to the host computer 13 from outside. That is, the user has not been registered onto the memory 103 for outside login permission. Since neither a one-time password not a pager ID for use in encryption is registered, when the login request of the user is made from outside through the stationary switched network, the host computer determines that the user is an unauthorized person.

In the case shown in FIG. 6, the user has been properly registered onto the memory 103 for outside login permission. Therefore, a one-time password and a pager ID for use in encryption are registered on the host computer 13. In the case where the user does not have the PC-card pager therewith, however, the encryption of the authentication information cannot be performed properly. Therefore, the host computer also determines that the user is an unauthorized person.

Figure 7:
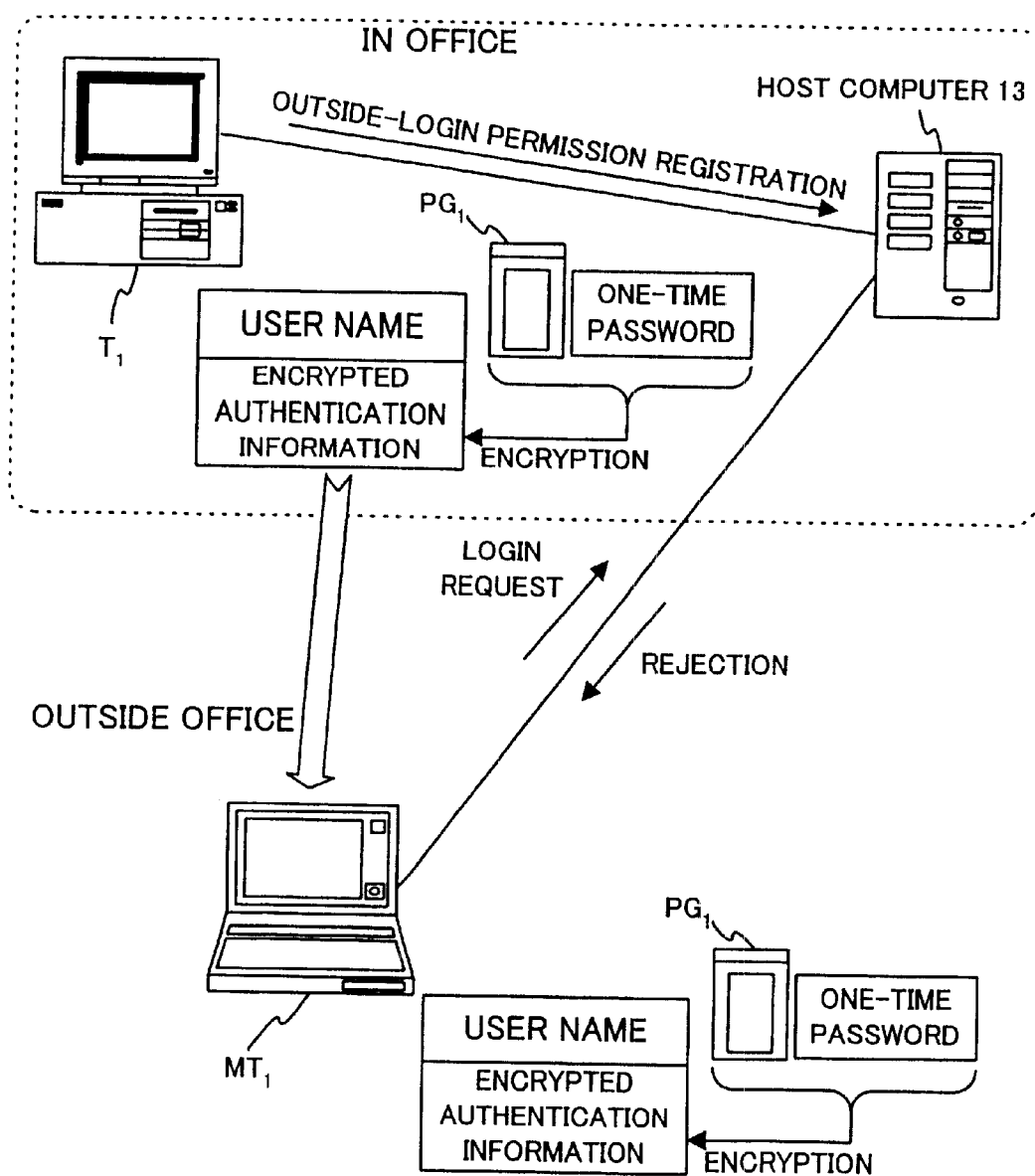
FIG. 7 is a schematic diagram showing an operation of the embodiment of the login method when a mobile terminal successfully logs in to the host computer.

Referring to FIG. 7, the user has been properly registered onto the memory 103 for outside login permission and the authentication information is properly encrypted using the pager ID and the one-time password. Therefore, the host computer determines that the user is an authorized person and permits the user to log in to the host computer 13.

As another embodiment of the present invention, the paging system may be used to transfer the one-time password from the host computer 13 to the PC-card pager. More specifically, the host computer 13 is connected to the paging system and calls up the PC-card pager that the user has. When the PC-card pager has been successfully called, the one-time password is transferred to the PC-card pager through the paging system and is stored onto the password memory 203 of the PC-card pager $PG_J$ through the radio receiver 207.

As described above according to the present invention, only a user who has been authorized to log in to the host computer from outside can log in to the host computer. Especially, the encryption of authentication information is performed based on the pager ID of the PC-card pager of the user's own and the one-time password previously assigned to the user. Therefore, the conditions required for login from outside become more strict, resulting in improved network security.

Since there is no need to send a one-time password from the host computer to the mobile terminal at a login, the login process can be rapidly completed.

What is claimed is:

1. A method of logging onto a local network from a remote terminal through a switched connection, the local network having a local terminal and a host connected thereto, the method comprising the steps of:
   at the local terminal, obtaining registry information from the host for logging the remote terminal onto the local network and storing the registry information in a transportable storage medium;
   moving the transportable storage medium having the registry information stored therein from the local terminal to the remote terminal; and
   logging onto the local network from the remote terminal through the switched connection using the registry information from the transportable storage medium.

2. The method of claim 1, wherein the transportable storage medium is a PC card.

3. The method of claim 1, further comprising the steps of encrypting the registry information on the transportable storage medium and decrypting the encrypted registry information at the remote terminal.

4. The method of claim 1, wherein the registry information includes a password.

5. The method of claim 1, wherein the remote terminal comprises a radio selective call receiver and wherein the registry information includes an identification number assigned to the receiver.

6. A method of logging onto a premises computer network from a mobile terminal that is connectable to the premises computer network through a public switched network, where the premises computer network has plural user terminals and a host computer connected thereto and at least one of the plural user terminals has a PC card slot for receiving a PC card having a memory, and where the mobile terminal has a PC card slot for receiving the PC card having a memory, the method comprising the steps of:
   at the at least one user terminal having the PC card in the PC card slot, requesting permission from the host computer for the mobile terminal to log onto the premises computer network;
   upon receipt of the requested permission from the host computer, storing the mobile terminal's login information and a password in the host computer and in the memory of the PC card;
   removing the PC card from the PC card slot of the at least one user terminal;
   inserting the PC card into the PC card slot of the mobile terminal;
   connecting the mobile terminal to the premises computer network through the public switched network;
   at the mobile terminal, requesting permission to log into the premises computer network by recalling the password and the user's login information from the PC card memory and transmitting the password and the user's login information to the host computer through the public switched network;
   at the host computer, comparing the password and the user's login information from the mobile terminal with the password and the user's login information stored in the host computer; and
   when the password and the user's login information from the mobile terminal match the password and the user's login information stored in the host computer, giving permission to the mobile terminal to log onto the premises computer network.

7. The method of claim 6, further comprising the step of encrypting the password and the user's login information on the PC card and decrypting the encrypted information at the mobile terminal.

8. The method of claim 6, wherein the mobile terminal comprises a radio selective call receiver and wherein the user's login information includes an identification number assigned to the receiver.

* * * * *